Dec. 11, 1962  R. R. JOHNSON  3,068,415
MINIATURE RADIO BEACON APPARATUS
Filed Sept. 11, 1958  2 Sheets-Sheet 1
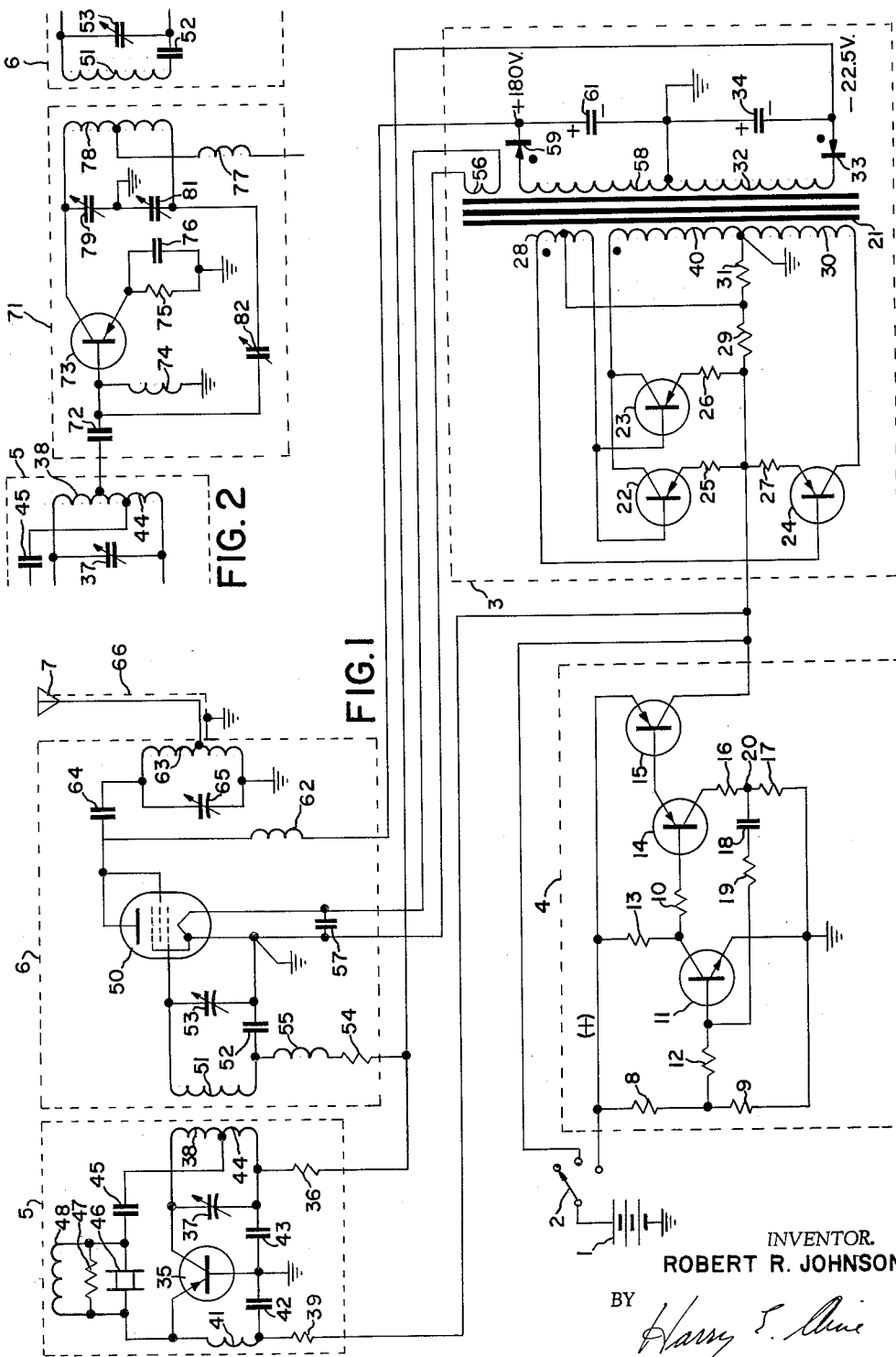
INVENTOR.
ROBERT R. JOHNSON
BY
ATTORNEY Dec. 11, 1962   R. R. JOHNSON   3,068,415
MINIATURE RADIO BEACON APPARATUS
Filed Sept. 11, 1958   2 Sheets-Sheet 2

FIG.3

INVENTOR.
ROBERT R. JOHNSON
BY
*Harry E. Aine*
ATTORNEY

United States Patent Office 3,068,415
Patented Dec. 11, 1962

3,068,415
MINIATURE RADIO BEACON APPARATUS
Robert R. Johnson, San Mateo County, Calif., assignor to Harry E. Aine and Arthur Leinwohl, as tenants in common
Filed Sept. 11, 1958, Ser. No. 760,361
5 Claims. (Cl. 325—104)

The present invention relates in general to miniature radio beacon apparatus and more specifically to a novel efficient ultra high frequency (U.H.F.) radio beacon especially adapted for supplying homing signals of sufficient strength to operate standard U.H.F. receiving and direction finding equipment, at line of sight ranges up to and in excess of 100 miles. The novel miniature radio beacon, because of its small size, weight and long operating life is especially useful in locating lost objects and persons such as, for example, recoverable missile re-entry bodies, drone aircraft, and survivors of aircraft and ship mishaps.

Heretofore various U.H.F. radio beacons have been proposed. One such prior art beacon weighs 3.7 pounds, occupies a volume of 60 cubic inches and provides an operating life of 20 hours. The present invention will provide three times the operating life of the certain prior art beacon while weighing and occupying one third of the previous weight and volume. When such weight and size limitations are reduced, the device is made practical for being carried on the person. Moreover, the prior art beacon has the additional disadvantage that it may not be utilized with standard military and commercial equipment but requires its own special receiver and direction finding antenna.

The present invention provides a miniature U.H.F. radio beacon that is of small size and weight and provides substantial range using standard homing equipment found in most military and commercial aircraft.

The principal object of the present invention is to provide a small lightweight, sufficiently powerful, radio beacon which is relatively inexpensive to construct and offers considerable operating life.

One feature of the present invention is the provision of a certain novel duty cycle for the miniature U.H.F. radio beacon wherein the beacon repeatedly emits an audio tone modulated carrier for a period long compared to $\frac{1}{10}$ of a second followed by a period of silence long compared to a period of one second duration, whereby the power required is minimized thereby greatly reducing the size and weight of the beacon apparatus.

Another feature of the present invention is the provision of means in the above feature circuit whereby the filament of the tube is repeatedly sequenced "on" for a period long compared to $\frac{1}{10}$ of a second followed by an "off" time long compared to one second whereby the power required to heat the tube filament is greatly reduced.

Another feature of the present invention is the provision of a novel hybrid U.H.F. beacon circuit in which a crystal controlled transistor oscillator at a frequency in excess of 110 mc. drives the grid circuit of a vacuum tube connected as a frequency doubler, and said tube serves as the final output tube, whereby the circuit complexity is greatly reduced and the cost thereof minimized.

Another feature of the present invention is the provision of a novel transistorized timer circuit for determining the duty cycle of the transmitter, said timer including a "turn on" circuit loop for determining the "on" time of the U.H.F. beacon and having a total series resistance of less than 20,000 ohms, whereby stray impulses are rendered non-responsive in influencing the timer circuit.

Another feature of the present invention is the provision of a novel timer circuit including an electrostatic shield disposed between the "turn on" loop of the timer circuit and a source of electrostatic impulses for rendering the timer circuit non-responsive to said impulses thereby allowing the proper functioning of the timer circuit.

Another feature of the present invention is the provision of novel transistorized power supply for supplying D.C. power to a plurality of loads through the intermediary of a single transformer, wherein said transformer is characterized by D.C. output loads on the secondary thereof which are reflected back to a center tapped primary of the transformer as greater power loads on one side of the center tapped primary than on the other side, whereby the size and complexity of the power supply is reduced over the size and complexity of a power supply having a balanced primary load.

Another feature of the present invention is the provision of novel combined power supply and modulator wherein a transistorized multivibrator operating at a certain audio frequency into the primary of a transformer produces a high voltage A.C. power output which is half wave rectified, partially filtered, and fed to the final R.F. output tube of the beacon transmitter, said rectified output power serving for tone modulating and supplying the high voltage operating potentials to the final U.H.F. output tube, whereby the need for a separate audio modulator is eliminated.

Another feature of the present invention is the provision of a novel U.H.F. beacon circuit including a transistor buffer amplifier series connected between a U.H.F. transistor oscillator crystal controlled at a frequency in excess of 110 mc. and a final output vacuum tube frequency doubler, whereby the crystal controlled oscillator is rendered substantially non-responsive to load fluctuations in the final output tube circuit whereby the electrical stability and circuit construction are facilitated.

Another feature of the present invention is the provision of a novel U.H.F. beacon circuit including a transistor oscillator crystal controlled at a frequency above 110 mc. driving a U.H.F. output transistor through the intermediary of a U.H.F. transistor frequency doubler whereby the power efficiency of the homer is greatly enhanced.

Other features and advantages of the present invention will become apparent upon a perusal of the following specification taken in connection with the accompanying drawings wherein:

FIGURE 1 is a circuit diagram of the novel U.H.F. beacon transmitter of the present invention, FIGURE 2 is a circuit diagram of a second embodiment of the present invention which includes a novel U.H.F. buffer amplifier, and FIGURE 3 is a circuit diagram of another embodiment of the present invention in which transistors are used instead of tubes throughout the circuit.

Referring now to FIGURE 1 there is shown a circuit diagram of the novel U.H.F. radio beacon of the present invention. Briefly the U.H.F. beacon includes a primary power source 1 for supplying low voltage D.C. power. The power drawn from the primary source 1 under load is supplied to a combined secondary power supply and modulator 3 via the intermediary and under the time control of a sequencer 4.

A switch 2 is series connected with the primary power source 1 for switching the low voltage D.C. power alternatively to one of three positions: (1) off; (2) directly to the combined secondary power supply and modulator 3; or (3) via the sequencer 4 to the power supply and modulator 3. The sequencer 4 determines the beacon's duty cycle for the 3rd mode of operation. Th combined secondary power supply and modulator 3 supplies several operating output voltages for energizing other portions of the beacon. One such D.C. operating voltage is supplied to a crystal controlled transistor oscillator 5 which in turn has its R.F. output coupled into the grid circuit of an output tube circuit 6 which is connected as a doubler. The U.H.F. output of tube circuit 6 is coupled to a suitable radiating antenna 7.

The primary power source 1 may comprise any suitable low voltage D.C. battery such as, for example, 10 series connected Mallory RM-12R cells. Such a battery will power the beacon for in excess of 50 hours of continuous operation on the 3rd or sequenced mode of transmission. Other suitable batteries would include, certain reserve batteries of the water emersion type or water activated type such as, for example, 8 series connected Burgess JO1375 cells. A battery of this type is particularly attractive for beacon application in finding lost objects at sea, since sea water may be utilized for the twofold purpose of activating the battery and serving as the switch for turning on the unit. In addition the reserve batteries have desirable low temperature operating characteristics.

The switch 2, in a preferred embodiment, comprises a double throw single pole subminiature toggle switch having one "momentary" position, one "on" position, and an "off" position. A switch of this design is made by Allied Control Company and is designated TSE. The switch 2 is preferably mounted on the exterior of a suitable housing, not shown, containing therewithin the beacon circuitry. The switch 2 may be provided with a suitable moisture proof boot which extends over the bat handle of the switch sealing it to the housing, not shown. The "momentary" position of the switch 2 preferably completes the direct connection between the primary power supply 1 and the secondary power supply and modulator 3.

The sequencer 4 includes a timer which activates a switch for sequencing the low voltage D.C. power to the combined secondary power supply and modulator 3. The timer may comprise any one of a number of suitable timing devices such as, for example, transistor timers, thermal actuated timers, and others as desired. In a preferred embodiment of the present invention, the timer includes a pair of transistors, the timing of which is controlled by a suitable R.C. network, said pair of transistors in turn controlling a third transistor serving as a switch.

More specifically, the timer includes two resistors 8 and 9 series connected in a shunting branch across the switch 2 and primary power source 1. The resistors 8 and 9 serve as a voltage divider for supplying bias voltages to a first npn transistor 11.

A current bias resistor 12 as of, for example, 33,000 ohms is connected in series with the base of transistor 11 for biasing the transistor 11 to a current conduction state in the absence of other control biases which will be explained below.

A load resistor 13 is placed in the collector circuit of the transistor 11 such that when the transistor 11 is conducting a pnp transistor 14, direct coupled from the load resistor 13, is thereby biased to a conducting state. A second pnp transistor 15 has its base series connected in the emitter circuit of the first pnp transistor 14. Transistor 15 serves as a switch. When the first pnp transistor 14 is conducting the switching transistor 15 is switched to the conducting state and thereby applies power to the combined secondary power supply and modulator 3.

The timer circuit includes two series connected load resistors 16 and 17 provided in the collector circuit of the first pnp transistor 14. The resistors 16 and 17 serve as a voltage divider for a feedback loop which is provided to determine the "on" and "off" time of the timer circuit. More specifically, a capacitor 18 and a resistor 19 are series connected in a branch between the node 20 of the voltage divider network and the base of the npn transistor 11. When the first pnp transistor 14 is shifted to the conducting state the node 20 shifts, for example, from 0 volt to +6 volts. This positive voltage is coupled via the series branch including capacitor 18 and resistor 19 to the base of the npn transistor 11 to hold it in the conducting state. The "hold-on" feedback loop includes capacitor 18, resistors 17 and 19 and base to emitter electrodes of npn transistor 11. The "hold-on" feedback loop has a certain time constant substantially defined by capacitor 18 and resistor 19.

After a finite time in the "hold-on" feedback loop, the +6 volts appearing at node 20 will be entirely dropped across capacitor 18 and therefore the "on" holding bias applied to the npn transistor 11 via the feedback loop will vanish. Since the collector to emitter voltage of transistor 11 has been diminished due to conduction and since the positive transient base "hold-on" bias has vanished the transistor will enter an unstable condition and shift to a non-conducting state.

When npn transistor 11 shifts to the non-conducting state transistors 14 and 15 are likewise shifted to the non-conducting state thereby shutting "off" the power to the combined secondary power supply and modulator 3. Node 20 in the collector circuit of transistor 14 is thereby shifted to zero potential. However, capacitor 18 is fully charged to, for example, +6 volts thereby causing a current to flow around a "hold off" loop including capacitor 18 and resistors 17, 9, 12 and 19. This "hold off" current drives the base of the first transistor 11 negative thereby holding it in the non-conducting state for a period of time determined by the time constant of the above defined "hold off" loop. After a finite time the negative "hold off" bias potential will drop sufficiently such that transistor 11 will be biased to a conducting state and the cycle of operation of the sequencer 4 repeats.

In a preferred embodiment of the present invention the time constants of the "hold on" and "hold off" feedback loops are selected to give an "on" time which is long compared to a 1/10 of second. The "off" time is selected to be long compared to a second. In this manner the average power consumption of the beacon apparatus is greatly reduced without adversely affecting the homing signal response in standard military and commercial U.H.F. receivers and direction finding equipments such as, for example, the AN–ARC 27 receiver using the AN–ARA 25 direction finding antenna unit.

The series resistance of the "hold on" loop of the timer should be low since its resistance serves as a load for stray impulses which may be capacitively coupled into the loop. Such impulses may originate in the combined power supply and modulator 3 during times when it is in a conducting state. These stray impulses, if of sufficient magnitude, will disturb the proper timing of the sequencer 4 by randomly triggering the npn transistor 11. It has been found that if the series resistance of the "hold on" loop is reduced below 22,000 ohms that the stray impulses are rendered non-responsive in affecting the sequencer 4.

In an alternative embodiment an electrostatic shield, not shown, is physically disposed between the combined secondary power supply and modulator 3 and the "hold on" loop. The shield will similarly render stray impulses non-responsive in adversely affecting the proper operation of the sequencer 4.

The combined power supply and modulator 3 includes a transformer 21 having a centertapped primary winding, the center tap of said primary being connected through ground to the negative terminal of the primary power source 1. The outside taps of said primary winding are connected to the positive terminal of the primary power source 1 through the intermediary of transistors 22, 23 and 24 and their respective emitter resistors 25, 26 and 27. The transistors 22, 23 and 24 form a multivibrator. A centertapped control winding 28 is also placed in the secondary of the transformer 21 for deriving control biases for the base electrodes of the transistors 22, 23 and 24.

A voltage divider network, comprising series connected resistors 29 and 31, is connected across the terminals of the primary power source 1. The node of the voltage divider network is connected to the bases of the transistors 22, 23 and 24 through the secondary control winding 28. The voltage divider derives a small negative D.C. voltage which is applied to the bases of the pnp transistors 22, 23 and 24. This small D.C. potential tends to bias the transistors toward the conducting state in the absence of other overriding transient control potentials.

In the combined secondary power supply and modulator 3 when the power is applied thereto via switching transistor 15 one side of the primary winding 30 controlled by transistor 24 will cause a transient feedback potential to be generated in the transistor control secondary winding 28. The transient feedback potential will be of the proper phase to drive the conducting transistor 24 to a fully conductive state and to bias the non-conducting transistors 22 and 23 further to the non-conducting state. After a finite time, determined by the inductive characteristics of the transformer core and windings of the transformer 21, the control transient potential will have fallen to a somewhat lower value such that the conducting transistor 24 starts to turn off. At this point both transistors enter an unstable state and the "on" transistor 24 rapidly turns "off" and the "off" transistors rapidly turn "on." The current is thus switched to the other transistors 22 and 23 and the other primary winding 40 will become energized. The control bias winding 28 will hold this primary winding 40 energized until the feedback potential drops, due to transformer saturation, sufficiently that the conducting transistors 22 and 23 become less conductive at which point the transistors will again switch the current through the other primary winding 30. The switching action of the transistors 22, 23 and 24 is carried on at a certain frequency primarily determined by the saturation flux density of the transformer core, number of primary turns, and applied D.C. voltage.

In a preferred embodiment of the present invention the switching frequency of transistors 22, 23 and 24 is an audio frequency between 2 and 5 kc. In this manner audio modulation of the output tube circuit 6 may be readily obtained by imperfectly filtering the output voltages of the secondary of the transformer 21. The modulation function will be more fully described later with regard to the output tube circuit 6.

The crystal controlled U.H.F. transistor oscillator 5 derives its negative D.C. collector bias from a secondary winding 32 on the transformer 21. A diode 33 is connected in series with winding 32 and a filtering capacitor 34 is connected shunting the diode 33 and winding 32 to ground for filtering out substantially all the audio amplitude modulation on the transistor negative collector D.C. bias voltage.

The filtered negative D.C. collector bias is applied to a U.H.F. pnp transistor 35 via resistor 36 and a tuned tank circuit which includes parallel connected variable capacitor 37 and tank coil 38. A D.C. emitter bias voltage is also taken directly from the positive terminal of the primary power source 1 through switching transistor 15 and applied to the emitter of the U.H.F. transistor 35 via current limiting resistor 39 and R.F. choke 41.

The base electrode of the U.H.F. transistor 35 is connected to ground and is D.C. isolated from the emitter and collector circuits via D.C. blocking capacitors 42 and 43.

The positive feedback loop of the crystal controlled oscillator 5 includes: a tap off 44 on the tank coil 38; a series connected D.C. blocking capacitor 45; and parallel connected crystal 46, resistor 47 and inductor 48. The stray capacitance of the crystal 46, and inductance of the inductor 48 are parallel resonant at or near the frequency of the crystal 46. The crystal 46 controls the frequency of the U.H.F. oscillator 5 at a pre-selected frequency. In a preferred embodiment of the present invention the crystal 46 is cut for a frequency above 110 mc. operating on its 7th overtone.

The output R.F. energy of the crystal controlled oscillator 5 is fed to the tuned grid circuit of the output tube 50 which is connected and tuned for operation as a frequency doubler. More specifically, the R.F. energy from the tank circuit of the crystal controlled oscillator 5 is inductively coupled into a tuned grid circuit including coil 51 parallel resonant with a series branch including fixed D.C. blocking capacitor 52 and variable capacitor 53. The tuned grid circuit is tuned for a resonance substantially at the operating frequency of the crystal controlled oscillator 5.

The output tube 50 has its grid electrode supplied with a fixed negative D.C. grid bias voltage derived from the secondary winding 32 via grid bias resistor 54, R.F. choke 55 and coil 51. When the grid draws current the grid bias resistor 54 furnishes the additional necessary negative voltage to maintain stability.

The filament voltage for the output tube 50 is supplied via a filament winding 56 on the secondary of the transformer 21. An R.F. bypass capacitor 57 is connected across the filament leads to prevent loss of R.F. energy in the filament resistance. By sequencing the output tube filament a very substantial saving in required battery power and size is obtained.

The positive plate potential for the output tube 50 is supplied from a winding 58 on the secondary of the transformer 21. A diode 59 is connected in series with the winding 58 and a filter capacitor 61 is connected across the winding 58 and diode 59 to ground for partially filtering the D.C. plate supply voltage. The value of capacitor 61 is chosen to leave a certain amount of amplitude audio modulation, at the operating frequency of the combined power supply and modulator 3, on the D.C. plate voltage. In a preferred embodiment of the present invention a plate audio modulation index of between 15% and 50% is found desirable. If the plate supply voltage is rectified only due to the rectifying action of the output tube 50 then undesirable band spreading of the output R.F. energy is obtained. This spreading may amount to 1 mc. on either side of the carrier frequency.

The plate supply voltage is applied to the plate and screen electrodes of output tube 50 via R.F. choke 62. An output tank coil 63 is parallel resonant with variable tuning capacitor 65 and series connected D.C. blocking capacitor 64 keeps the plate potential from being shorted to ground through the tank circuit. The resonant frequency of the output tube tank circuit is twice the frequency of its grid tank whereby the output frequency is double the frequency applied to the grid circuit.

Output U.H.F. energy is tapped out of the output tube tank circuit via a coaxial line 66 to a quarter wave stub antenna 7.

A continuous mode of operation, steady audio tone, is obtained by moving switch 2 to the "momentary" position. In this position the sequencer 4 is bypassed and power is continuously supplied to the combined secondary power supply and modulator 3. This feature is especially useful for allowing the operator to send code or for sending a continuous homing signal to further aid in localizing a survivor. The continuous mode is especially useful when the survivor has the searcher in sight.

Another embodiment (see FIGURE 2) of the present invention includes a transistor buffer amplifier 71 disposed between the crystal controlled oscillator 5 and the output doubler tube circuit 6. More specifically, the output of the crystal controller oscillator 5 is tapped off the oscillator output coil 38 and fed via D.C. blocking capacitor 72 to the base of a U.H.F. transistor amplifier 73. The base of the buffer transistor 73 is connected to ground via R.F. choke 74. The emitter voltage for the buffer transistor 73 is derived via emitter bias resistor 75 co-operating with R.F. by-pass capacitor 76 which together have a time constant of sufficient duration to obtain class C operation of buffer amplifier transistor 73. The R.F. bypass capacitor 76 bypasses R.F. to the collector circuit via ground.

The collector potential for the buffer transistor 73 is derived from the filtered and rectified winding 32 of the transformer 21 via R.F. choke 77, and centertapped buffer output tank coil 78. The tank coil 78 is parallel resonant, at the frequency of the crystal oscillator 5, with series connected variable capacitors 79 and 81. Variable capacitors 79 and 81 balance the R.F. voltage between the ends of the tank coil 78 and ground.

A neutralizing capacitor 82 is connected between the base of transistor 73 and the end of coil 78 which is remote from the collector of transistor 73 whereby a neutralizing R.F. potential is obtained for cancelling out the positive feedback R.F. potential coupled into the base via stray base to collector capacitance, not shown.

The output signal from the buffer amplifier is inductively coupled into the grid circiut of the output doubler tube 50. The buffer amplifier 71 tends to isolate the crystal oscillator 5 from the tube load whereby fabrication of the circuit is facilitated.

Typical circuit values for a miniature U.H.F. beacon operating at 243.0 megacycles per second are shown below in Table I. These values, of course, are not limiting but are only exemplary.

TABLE I

| No: | Value |
| --- | --- |
| 1 | 12 v. |
| 8 | 100 KΩ. |
| 9 | 1 KΩ. |
| 10 | 2.2 KΩ. |
| 11 | 2N169 A. |
| 12 | 33 KΩ. |
| 13 | 10 KΩ. |
| 14 | 2N207B. |
| 15 | (2) 2N224s. |
| 16 | 270 Ω. |
| 17 | 270 Ω. |
| 18 | 22 μf. |
| 19 | 10 KΩ. |
| 21 | (2) Deltmax ¾" x ½" Torroids. |
| 22 | 2N224. |
| 23 | 2N224. |
| 24 | 2N224. |
| 25 | 2.7 Ω. |
| 26 | 2.7 Ω. |
| 27 | 2.7 Ω. |
| 28 | 20 turns C.T. |
| 29 | 47 Ω. |
| 30 | 32 turns. |
| 31 | 1.5 KΩ. |
| 32 | 78 turns #34 HF. |
| 33 | 1N91. |
| 34 | 5 μf–50 v. |
| 35 | GA 53194. |
| 36 | 120 Ω. |
| 37 | 0.7–12 μμf. |
| 38 | 8 turns ½" dia. |
| 39 | 1.2 KΩ. |
| 40 | 32 turns #28 H.F. |
| 41 | 10 mh. |
| 42 | 0.001 μf. |
| 43 | 0.001 μf. |
| 45 | 24 μμf. |
| 46 | 121.5 mc. crystal. |
| 47 | 3.9 KΩ. |
| 48 | 10 turns # 28 HF. |
| 50 | CK6397. |
| 51 | 4 turns ½" dia. |
| 52 | 0.001 μf. |

TABLE I—Continued

| No.: | Value |
| --- | --- |
| 53 | 0.8–8.5 μμf. |
| 54 | 220 KΩ. |
| 55 | 2.2 μh. |
| 56 | 5 turns #22 HF. |
| 57 | 0.001 μf. |
| 58 | 600 turns #34 HF. |
| 59 | 3FS2. |
| 61 | 0.05 μf.–400 v. |
| 62 | 1.0 μh. |
| 63 | 3 turns ⅜" dia. |
| 64 | 0.001 μf. |
| 65 | 0.8–4.5 μμf. |

The all transistor circuit of the present invention is shown in FIGURE 3. More specifically, for the pulse or sequenced mode of operation the low voltage D.C. power is supplied to the sequencer circuit from the low voltage primary power supply 1 via one terminal of a double pole double throw switch 91. The load on the second transistor 14 of the timer comprises the exciting coil 92 of a sensitive double pole single throw relay 93.

The relay 93 operates as a switch and is activated by the sequencer for applying the D.C. emitter bias to the transistor oscillator 5 via contact 94 of the relay 93. The relay also closes the circuit to a second D.C. primary power source 95 via contact 96 of relay 93 and switch 91.

The second D.C. primary power source 95 supplies negative D.C. collector voltage to the transistor oscillator 5 and other transistors which will be described below.

The crystal controlled R.F. output of the transistor oscillator 5 is coupled into the base circuit of transistor 97, connected as a doubler, via coupling capacitor 98. The base electrode of the doubler transistor 97 is D.C. biased at ground potential and isolated from ground for R.F. energy via R.F. choke 99.

The output tank of the doubler transistor 97 includes parallel resonant variable capacitor 101 and coil 102. The doubler output tank circuit is tuned for resonance at twice the frequency of the transistor oscillator 5 for doubling therein. Radio frequency bypass capacitors 103 and 104 complete the R.F. circuit for the doubler transistor 97 via ground. Emitter D.C. bias resistor 105 co-operates with bypass capacitor 104 and together provide the proper time constant to give the proper D.C. emitter bias for class C operation of the doubler transistor 97.

The negative D.C. collector bias is supplied to the doubling transistor 97 from the second negative primary power source 95 via an R.F. choke 106 and coil 102.

The R.F. output energy from the doubler transistor 97 is fed to the base electrode of an output amplifier transistor 107 via coupling capacitor 108 which is tapped off the doubler output tank coil 102. The base electrode of the amplifier transistor 107 is D.C. biased at ground potential through R.F. choke 109.

Collector negative D.C. bias voltage is applied to the collector of the amplifier transistor 107 from the second primary power source 95 via R.F. choke 111 and an output tank coil 112 which is parallel resonant, at the output frequency, with a variable capacitor 113. The output R.F. circuit is completed through ground via D.C. blocking capacitor 114 and R.F. emitter bypass capacitor 115. An emitter D.C. bias resistor 116 is parallel connected with emitter bypass capacitor 115 and the time constant of the two elements provides the proper negative emitter D.C. bias voltage for class C operation of the amplifying transistor 107.

A neutralizing capacitor 117 is connected between the base electrode of transistor 107 and a tap 118 on a coil 119 inductively coupled to the output tank of the amplifying transistor 107. The neutralizing capacitor 117 feeds back to the base electrode of transistor 107 a voltage of approximate equal amplitude and opposite phase of an R.F. voltage coupled back to the base from the tank circuit via stray base to collector capacitance thereby preventing unwanted oscillation.

An audio modulating transistor 121 has its base D.C. bias voltage supplied via two voltage divider resistors 122, and 123 which are series connected across the second primary D.C. power source 95. The collector voltage for the modulating transistor 121 is supplied from the second primary D.C. power source 95 via the primary winding of an audio transformer 124 parallel resonant at an audio frequency with series connected capacitors 125 and 126.

The D.C. emitter bias voltage for transistor 121 is supplied via emitter bias resistor 127 connected between the emitter electrode and ground. A variable audio gain control resistor 128 is connected between the audio tank circuit and the emitter electrode for controlling the amplitude of audio oscillation of the modulating transistor 121. The series capacitors 125 and 126 serve as an audio voltage divider network for deriving the proper amplitude of positive feedback voltage to sustain oscillation.

The audio output of the modulating transistor 121 is in the form of a sine wave and is coupled into the collector D.C. bias circuit of the R.F. output amplifying transistor 107 via the secondary of audio transformer 124 and serves to audio tone modulate the R.F. output. An R.F. bypass capacitor 130 bypasses R.F. back to the emitter circuit via ground and also serves to bypass the higher fourier components of the audio modulation to ground.

The audio modulated R.F. output of the amplifying transistor 107 is coupled to the antenna 7 via series resonant variable capacitor 129 and output coil 119 and coaxial line 66.

In the continuous mode of operation, steady tone, low voltage D.C. power from the primary power source 1 bypasses the timer circuit by jumper lead 131. The D.C. voltage from the second primary power source 95 bypasses timer operated switch 93 via jumper lead 132. Jumper leads 131 and 132 are connected to the pair of poles corresponding to the continuous mode of operation of double pole double throw switch 91.

Since many changes could be made in the above construction and many apparently widely different embodiments of this invention could be made without departing from the scope thereof, it is intended that all matter contained in the above description and shown in the accompanying drawings shall be interpreted as illustrative and not in a limiting sense.

What is claimed is:

1. A miniature U.H.F. radio distress transmitter useful for locating lost objects and persons including, means for generating an ultra high frequency output radio homing signal, a battery for supplying power to said generating means, means for precisely controlling the ultra high frequency of said generating means, means for modulating the ultra high frequency homing signal at an audio frequency whereby an aural signal is produced when the homing signal is detected by homing receiver equipment, means for automatically continuously sequencing a certain predetermined duty cycle for the output audio modulated ultra high frequency homing signal to produce an output signal containing a continuous train of time displaced audio modulated pulses of ultra high frequency radiation, said certain duty cycle being characterized by an individual pulse length in excess of one tenth of a second but less than two seconds, whereby the pulse will be responsive in standard direction finding receivers employing servo-controlled rotatable antenna systems, followed by a substantially quiescent period of duration at least twice the pulse length but less than fifteen seconds, and said duty cycle being defined by the ratio of the duration of the pulse length to the duration of the quiescent period between pulses and further being characterized by the ratio falling within the range of one-half to one-twentieth, whereby the battery power consumed by the radio beacon is minimized, in use.

2. The apparatus according to claim 1 wherein said duty cycle is further characterized by said quiescent period being substantially at least one second long.

3. The apparatus according to claim 1 wherein said duty cycle sequencing means includes, a first transistor and a second transistor, a feedback circuit loop for feeding a signal from said second transistor to said first transistor for controlling the pulse duration of said homing signal generator, said feedback loop including a series connected resistor and capacitor, and the total series resistance of said feedback loop being less than twenty thousand ohms whereby stray impulses generated in the beacon circuits are rendered substantially non-responsive in affecting the timing function of said sequencing means.

4. The apparatus according to claim 1 wherein said time sequencing means includes, a first transistor and a second transistor connected in cascade, a feedback circuit loop for feeding a signal from said second transistor to said first transistor for controlling the pulse duration of said homing signal generator means, and a wave energy reflecting member disposed between said feedback loop and a source of stray impulses within the circuits of the radio beacon for shielding said feedback loop from the stray impulses whereby the timing function of said sequencing means is not adversely affected by the stray impulses.

5. The appaartus according to claim 1 wherein said audio modulating means includes, means for converting the D.C. battery voltage to a higher D.C. voltage as applied to said ultra high frequency signal generating means, said converter means including a transistor multivibrator operating at a certain audio frequency, a transformer serving as the load for said multivibrator, means for rectifying the higher voltage output voltage of said transformer as supplied to said generating means, and means for partially filtering the rectified high voltage output such that a certain substantial amount of amplitude modulation is left on the higher D.C. output voltage applied to said generating means, whereby the output U.H.F. homing signal is amplitude audio modulated without producing unwanted band spreading in the output homing signal.

References Cited in the file of this patent

UNITED STATES PATENTS

| | | |
|---|---|---|
| 2,480,338 | Purington | Aug. 30, 1949 |
| 2,485,608 | Keim | Oct. 25, 1949 |
| 2,555,867 | Bennett | June 5, 1951 |
| 2,776,420 | Woll | Jan. 1, 1957 |
| 2,851,592 | Webster | Sept. 9, 1958 |
| 2,891,195 | Smyth | June 16, 1959 |
| 2,900,634 | Algase | Aug. 18, 1959 |

OTHER REFERENCES

"New Transmitter for U.S. Satellite," Radio & TV News, June, 1958 (p. 82 relied on).

Electronics, Aug. 1, 1958, pp. 98 and 100. Distress Transmitter Is Hybrid, by H. B. Seisbecker.